United States Patent
Scharf et al.

[11] Patent Number: 6,105,869
[45] Date of Patent: Aug. 22, 2000

[54] SYMBOL READING DEVICE INCLUDING OPTICS FOR UNIFORMLY ILLUMINATING SYMBOLOGY

[75] Inventors: Bruce R. Scharf, Seattle, Wash.; Donald S. Fisher, Valley Center, Calif.

[73] Assignee: Microscan Systems, Incorporated, Renton, Wash.

[21] Appl. No.: 08/961,581

[22] Filed: Oct. 31, 1997

[51] Int. Cl.⁷ .................................................. G06K 7/10
[52] U.S. Cl. ....................... 235/454; 235/462.41
[58] Field of Search ................... 235/454, 436, 235/455, 459, 471, 473

[56] References Cited

U.S. PATENT DOCUMENTS

| | | | |
|---|---|---|---|
| 4,409,470 | 10/1983 | Shepard et al. | 235/472 |
| 5,291,009 | 3/1994 | Roustaei | 235/472 |
| 5,349,172 | 9/1994 | Roustaei | 235/472 |
| 5,354,977 | 10/1994 | Roustaei | 235/472 |
| 5,484,994 | 1/1996 | Roustaei | 235/462 |
| 5,508,505 | 4/1996 | Walts et al. | 235/472 |
| 5,600,116 | 2/1997 | Seo et al. | 235/455 |
| 5,627,358 | 5/1997 | Roustaei | 235/462 |
| 5,702,059 | 12/1997 | Chu et al. | 235/462 |

*Primary Examiner*—Thien M. Le
*Assistant Examiner*—Daniel St. Cyr
*Attorney, Agent, or Firm*—Graybeal Jackson Haley LLP

[57] ABSTRACT

A device and method for uniformly illuminating bar codes and two dimensional symbologies. An illumination source is mounted within the device to flood an area congruent with the field of view of the imaging optics with light to be reflected off of a code symbol. The imaging optics collects the reflected illumination received back through the window and images the same on a detector focal plane. An array of solid state light-emitting diodes are disposed adjacent to the imaging optics and a diffuser is placed between the emitters and the device window for illumination source. The emitters and diffusers are spatially arranged so as to cause homogenous distribution of light energy beyond the window and congruent with the field of view of the imaging optics.

18 Claims, 4 Drawing Sheets

SYMBOL READING DEVICE INCLUDING OPTICS FOR UNIFORMLY ILLUMINATING SYMBOLOGY

FIELD OF THE INVENTION

The present invention relates to a device and method for reading bar codes and symbologies. In particular, it provides for uniformly illuminating one-dimensional bar codes and two-dimensional symbologies (e.g. matrix codes) in high speed optical recognition applications.

BACKGROUND OF THE INVENTION

Technological advances in the automatic identification industry have provided many industries ways to improve productivity and increase efficiency in many of the processes requiring the collection of data. These industries include inventory control, product flow, quality control, purchasing, and other related business activities. One automated method for collecting data is through the use of devices which read and decode symbol codes. Most people are familiar with the use of scanners for reading bar codes on product labels in retail applications.

A number of different bar code readers and laser scanning systems have been developed to read and interpret bar codes. Optical scanners are available in a variety of configurations including fixed scanning stations and handheld devices. A number of these devices use laser diodes to produce a beam which is scanned across the code to be read and then interprets the reflections returned by the scanning beam. While effective, laser diode scanners are expensive to manufacture and are more susceptible to maintenance problems.

Another type of symbol code reader uses an illumination source in conjunction with an image sensor, typically charge coupled device (CCD). This type of bar code reader is generally referred to as a "CCD scanner" (despite the fact that it does not scan the code in the same fashion a laser diode scanner would). CCD technology is the same technology used in video and digital still cameras. In general a charge coupled device is semiconductor device wherein minority charge is stored in a spatially defined depletion region (potential well) at the surface of a semiconductor and is moved about the surface by transferring this charge to similar adjacent wells. When used as an image sensor, the charges are introduced when the light from a scene is focussed on the surface of the device. The image points are accessed sequentially to produce a television type output signal. While conventional CCD barcode readers are typically less expensive to manufacture they tend to have a very narrow field of view and are unable to adequately illuminate the target symbol to be used in high speed applications. When used as method of capturing data, a light source is used to illuminate the object, and, with the use of optical elements, can recreate the image on the CCD. By capturing the image on the CCD array, the image is converted to an electrical signal and can then be processed and used in a given application. These applications may include reading bar codes, 2-D symbologies, fingerprints, signatures, optical character recognition and many others.

Some applications require reading images at high speed as the image is presented to the reader via a conveyer belt. These applications are prevalent in small package distribution, letter sorting, and industrial and pharmaceutical manufacturing. When scanning at high speed, one of the most difficult problems is not providing high intensity, uniform illumination to cover the target area. The two most commonly used devices are flash strobes and light emitting diodes (LEDs). The flash strobe is capable of providing enough light to be used in high speed applications where the exposure time is very short. However, because flash strobes are relatively expensive and have short life span, they are only used in expensive systems. In addition, flash strobes require high voltage to operate and, as a result, need warning labels to alert personnel of the danger. The LED is normally used in low speed applications since it does not provide sufficient light, nor is it uniform within the target area, henceforth referred to as the field of view (FOV) or field of illumination.

There are many devices and methods already well known in the prior art to provide illumination for automatic identification or bar code scanning. U.S. Pat. No. 4,315,245 teaches the use of two linear arrays of LEDs to illuminate a target area, with a control circuit used to vary the amount of illumination. This method, however, does not produce a uniform 2-D illumination, nor is the light homogenous from the light-emitting diodes. U.S. Pat. No. 5,192,856 teaches a method for producing a 1-D or 2-D area of illumination for scanning applications. However, this method lacks sufficient intensity for high speed applications. U.S. Pat. No. 5,532,467 teaches a method of using a linear array of LEDs providing a fan of light. However, this is only suitable for 1-D bar code scanning as it does not illuminate a sufficient 2-D area to allow 2-D symbologies to be read.

There is a need for an LED-based scanning device which provides adequate illumination for both 1-D bar codes and 2-D symbologies for both hand-held and fix-mount applications. There is a further need for method and device which is suitable for applications involving high speed scanning in which high intensity illumination must be provided during very short exposure times. There is a yet a further need for device which provides highly uniform illumination over the target area. Finally, there is a need a device which provides linear polarized light for applications in which highly specular targets must be illuminated and imaged with high contrast.

SUMMARY OF THE INVENTION

The present invention is directed to a device and method for reading two-dimensional bar code symbologies using an image sensor (a charge coupled device in the preferred embodiment) in conjunction with an array of light-emitting diodes and an inventive optical arrangement that substantially obviates one or more problems due to the limitations and disadvantages of the prior art.

To achieve these and other advantages, and in accordance with the purpose of the present invention, as embodied and broadly described herein, the invention is a method and device for reading and interpreting two-dimensional symbologies. The method comprises illuminating the 2-D symbologies using an illumination source (a plurality of LEDs in the preferred embodiment), focussing the reflected image onto an image sensor (a CCD in the preferred embodiment), and then interpreting the signal produced by the image sensor. The light emitted from the LEDs is passed through a collimator and an optical diffuser in order to provide a uniform high intensity illumination of the target symbol. The emitted light may also be passed through a polarizer and the reflected light passed through an analyzer (a second polarizing lens which is rotated 90 degrees from the first) to remove the effects of specular reflection.

The present invention is preferably embodied in a device having a plurality of LEDs that match the field of view of the imaging lens and the aspect ratio of the CCD. The LEDs are arranged in an array which circumscribe the imaging lens optics. Sufficient energy is collected and collimated by a series of optical lenses which allows image capture of moving objects with very short exposure times some on the range of 1/10,000 of second to 0.1250 of a second. The LEDs can have any suitable operating wavelength and therefore may be visible or invisible to a human observer. Collimation can be homogenized by use of holographic surface relief diffusers. The diffusers can be integral to the scanner window, the collimator, or they can be a separate optical element having optical power. The elimination can be linearly polarized to reduce specular reflection and increased contrast from the target having both neighboring specular and diffuse reflecting features by means of a polarizing optical element.

BRIEF DESCRIPTION OF THE DRAWINGS

Understanding of the present invention will be facilitated by consideration of the following detailed description of a preferred embodiment of the present invention taken in conjunction with the accompanying drawings, in which like numerals refer to like parts and in which.

DETAILED DESCRIPTION OF THE INVENTION

Figure 1:
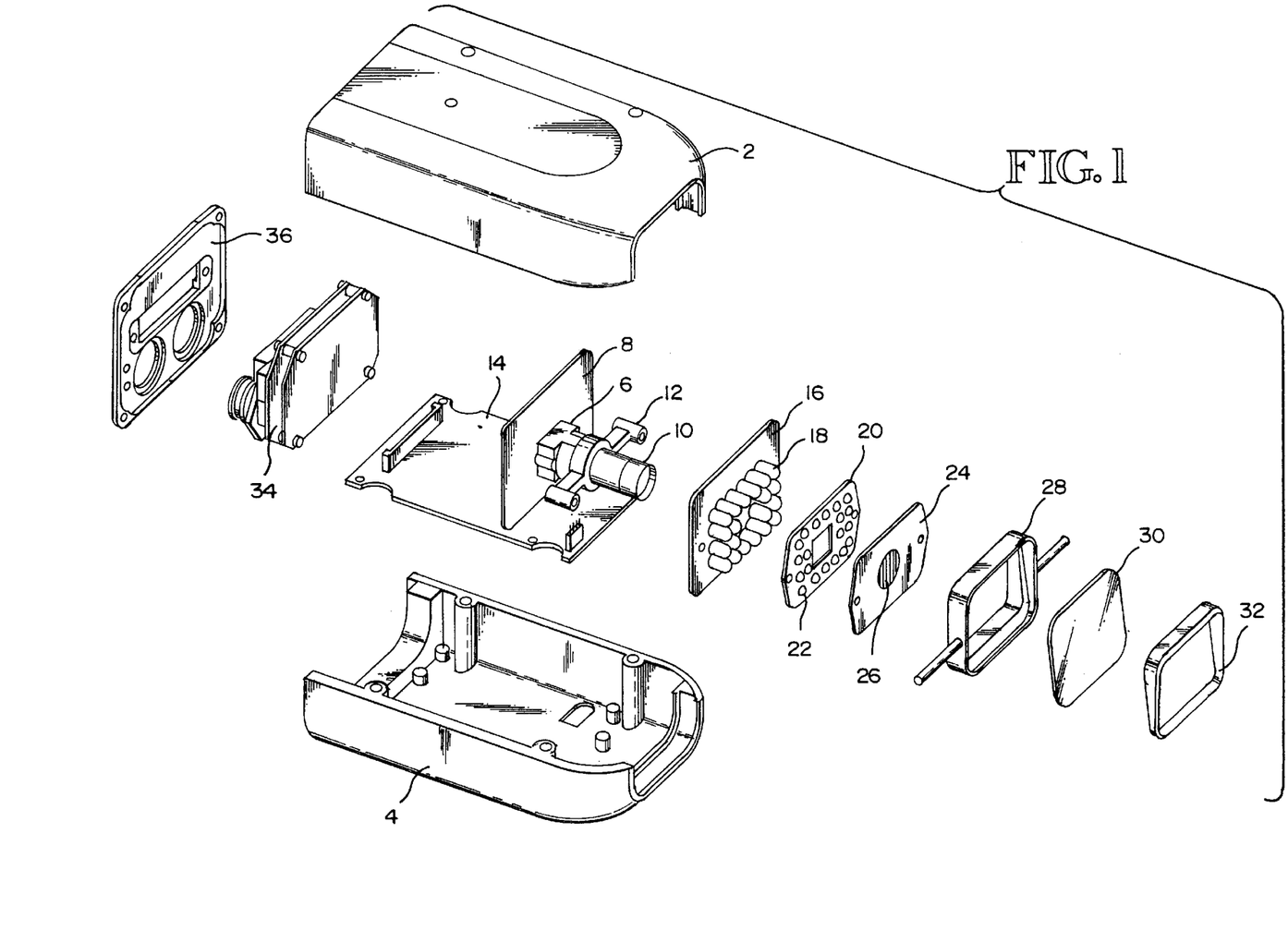
FIG. 1 is an exploded isometric drawing of the scanning device of the present invention.

As embodied and shown in FIG. 1, the present invention includes a charge coupled device (CCD) 6 mounted on a printed circuit board 8 which contains the host electronics for operating the CCD. An imaging lens 10 is attached and held in alignment with the CCD 6 by alignment bracket 12. An array of light-emitting diodes 18 are arranged in a generally rectangular pattern on LED printed circuit board 16. A central imaging aperture is provided in the board 16 wherein diodes 18 circumscribe this aperture. The LED printed circuit board 16 is attached and held in alignment by alignment bracket 12 with imaging lens 10 passing through the central aperture in LED printed circuit board 16. Collimator 20 is also attached and held in alignment by alignment bracket 12 and is also provided with an aperture through which imaging lens 10 projects. In the present invention collimator 20 is comprised of an array of collimating lenses arranged in the same pattern and in one-to-one alignment with the LEDs of array 18.

In the preferred embodiment, collimator 20 is provided with an integral diffuser 22 which is preferably formed as a surface film or coating on collimator 20. Polarizer 24 is also attached and held in alignment by alignment bracket 12. Polarizer 24 linearly polarizes the light from the LED array 18 after it is passed through collimator 20 and diffuser surface 22. The central portion of polarizer 24 contains analyzer 26 which linearly polarizes the light entering the device from the outside. Analyzer 26 polarizes light 90° angle from polarizer 24. CCD printed circuit board 8 with the attached alignment bracket 12, LED printed circuit board 16, collimator 20, and polarizer 24 are attached to main printed circuit board 14. The main printed circuit board 14 is mounted within lower case half 4 and upper case half 2. Gasket 28 is sandwiched between upper case half 2 and lower case half 4b. Window 30 is fit within gasket 28 and held in place by window retainer 32. An interface printed circuit 34 board is also attached to main printed circuit board 14. Back panel 36 attaches to upper case half 2 and lower case half 4 after assembly and is provided with apertures which allow access to the input and output of interface printed circuit board 34.

Figure 2A:
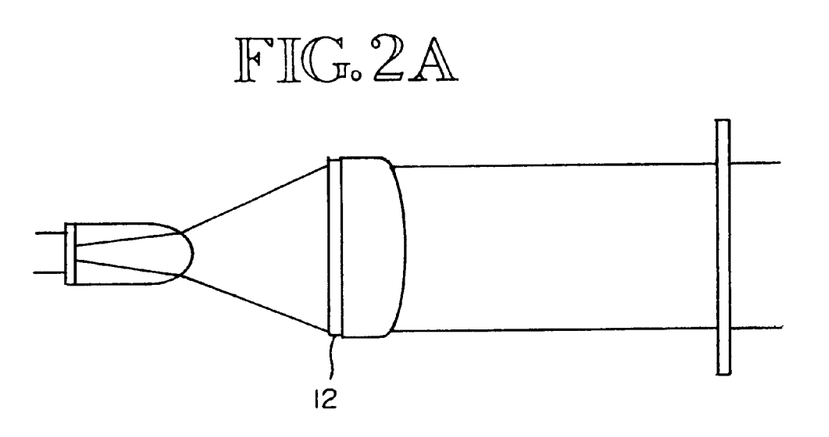
FIG. 2A is a diagrammatical representation of the system of the present invention utilizing a spherical or toroidal plano-convex refractive collimator lens having an integral diffuser surface.
Figure 2B:
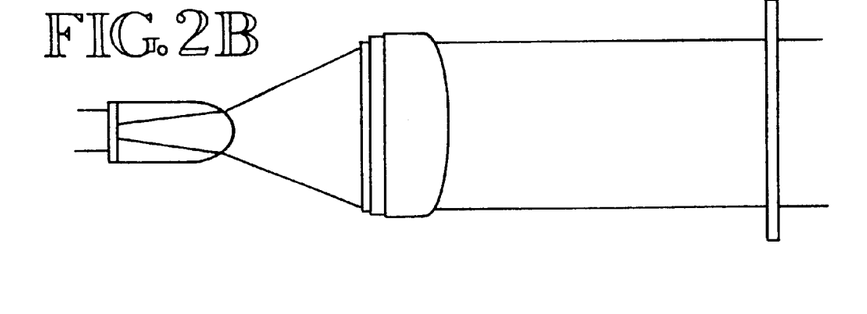
FIG. 2B is a diagrammatical representation of the system of the present invention utilizing a spherical or toroidal piano convex refractive collimator lens having an integral diffuser surface and an integral linear polarizer.
Figure 2C:
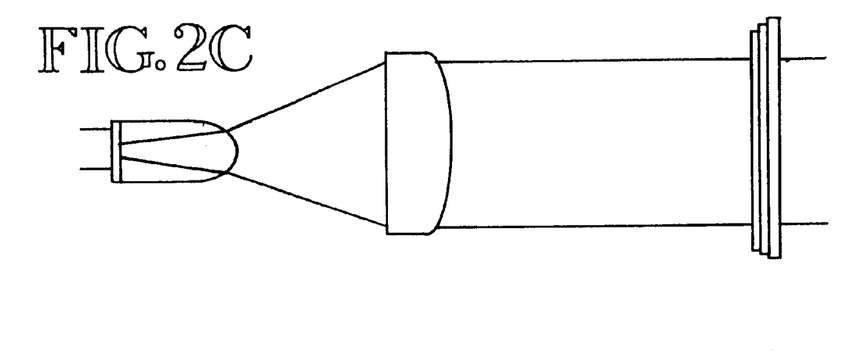
FIG. 2C is a diagrammatical representation of the system of the present invention utilizing a spherical or toroidial piano convex refractive collimator lens and separate diffusing and polarizing optical elements attached to the scanner window.

FIG. 2A illustrates a method and device for providing uniform illumination for applications requiring fixed read distances and high speed image capture. This method uses a spherical or toroidal plano-convex lens 38, having its focus located at approximately the tip of the LED 18. In this embodiment, the lens has an integral diffuser surface 22. Diffuser surface 22 is typically 1 to 10 mils thick and is attached by means of an adhesive material. The diffuser 22 can also be molded on one side of said lens 38. The diffuser 22 collects light radiation from the LED 18 and distributes it in a prescribed shape and aspect ratio which can vary from 1:1 to 1:40, depending upon the application. The aspect ratio is chosen to project the illumination at independent horizontal and vertical angles. FIG. 2B shows the same optical arrangement with the addition of linear polarizer 24. Linear polarizer 24 is also typically affixed with a pressure sensitive adhesive and is approximately 1 to 10 mils thick. FIG. 2C shows the same optical arrangement with the diffuser 22 and linear polarizer 24 attached to the scanner window 30.

Figures 3A, 3B, 4:
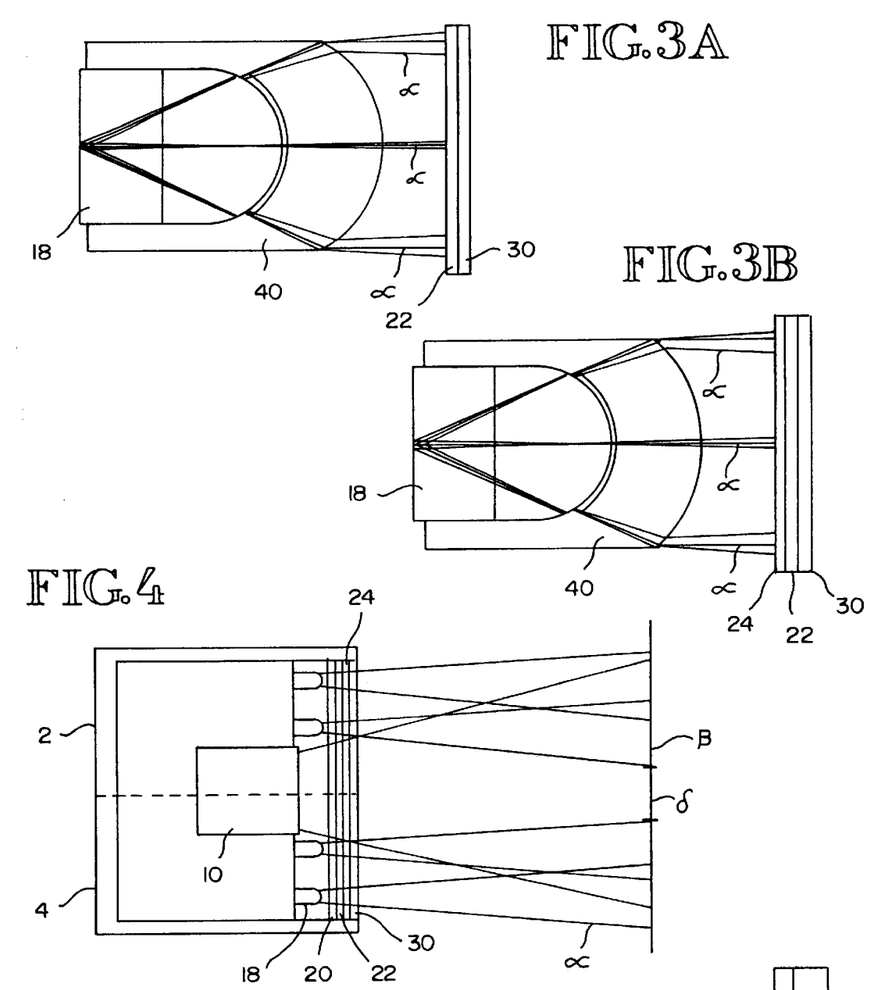
FIG. 3A is a diagrammatical representation of the system of the present invention using a meniscus-shaped collimator lens in conjunction with a separate diffuser optical element.
FIG. 3B is a diagrammatical representation of the system of the present invention using a meniscus-shaped collimator lens and separate polarizer and diffuser optical element.
FIG. 4 is the diagrammatical representation of the system of the present invention illustrating the positioning of the imaging lens with relation with LED array.

FIG. 3A illustrates the method utilizing a meniscus-shaped collimator lens segment 40 to capture the illumination from the LED array 18 and collimate the rays α before it impinges the diffuser 22 which is attached to the scanner window 30. The mathematical description of the collection optic is a cubic spline, a spherical, or conical surface that is rotationally symmetric about the optical axis of the LED. It serves to collect and project the energy from the LEDs through a combination of refraction and internal reflection. In FIG. 3B, there is yet another arrangement in which linear polarizer 24 is used in combination with diffuser 22 to produce polarized light for highly specular targets.

Figure 7:
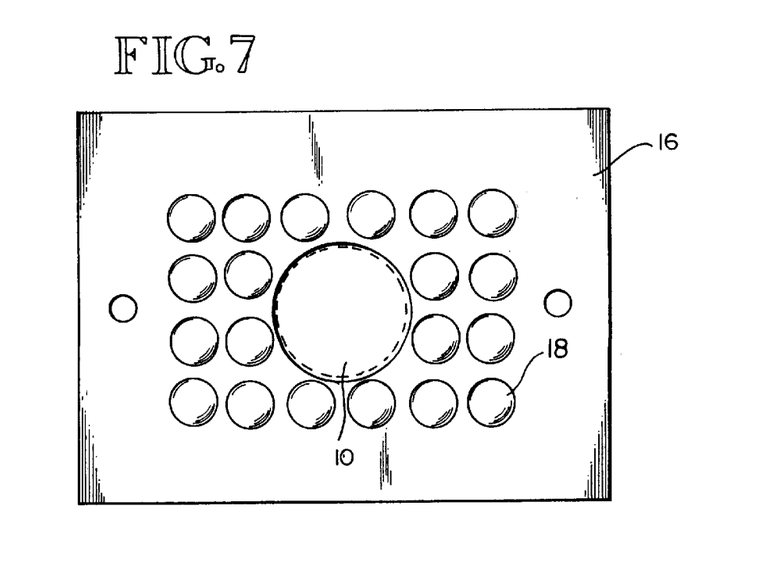
FIG. 7 is a diagrammatical representation of the system of the present invention illustrating the arrangement of the LED array with relation to the imaging lens as it would appear if viewed through the window of the device of the present invention.

FIG. 4 and FIG. 7 show the preferred embodiment for the arrangement of the LEDs 18 about imaging lens 10. In the preferred embodiment, the LEDs 18 have an output cone of 7 to 8 degrees. In the preferred embodiment 20 high performance amber-type (or other wavelength as necessary) LEDs such as the Hewlett-Packard HLMP-DLOx are used. The LED array 18 floods the target plane β and circumscribes the field of view δ of the imaging lens 10. The total extent of the illumination in the vertical and horizontal directions is approximately equal to that of the housing (upper case half 2 and lower case half 4 combined) and just overfills the field of view of the imaging lens at the target.

The LEDs 18 are arranged such that the light they emit passes through the collimator 20 with an integral diffuser 22 and project light through a polarizer 24 and front window 30. The imaging lens 10 (collection optic) has a linear polarizer (the analyzer 26 depicted in FIG. 1) whose polarization direction is rotated 90° from the direction of the polarizer 24. The LED array 18 is pulsed for a duration necessary to freeze the motion of the target β. The LEDs 18 are driven with a five volt supply, with a peak forward current of 90 mA, thereby ensuring a total peak power consumption of less than 10 W.

Figure 5:
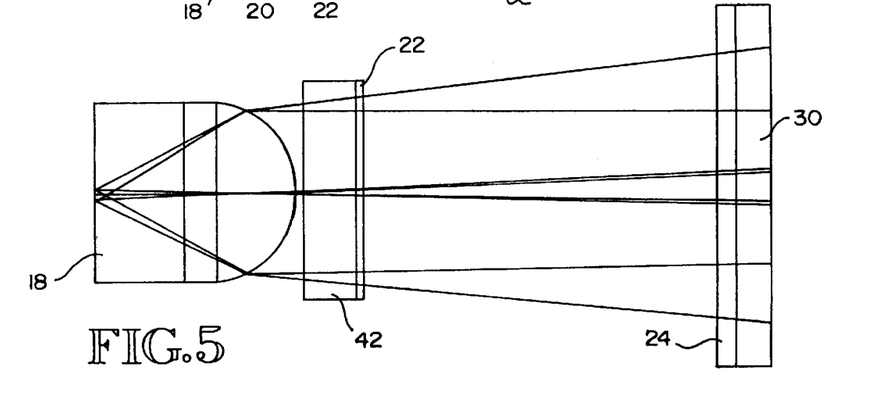
FIG. 5 is a diagrammatical representation of the system of the present invention using a Fresnel collimator lens.

FIG. 5 shows LED 18 emitting light rays a through a Fresnel collimator lens segment 42 which has an integral diffuser surface 22. A Fresnel lens is a type of diffractive lens. The beams a pass through polarizer 24 and out through window 30.

Figures 6A, 6B:
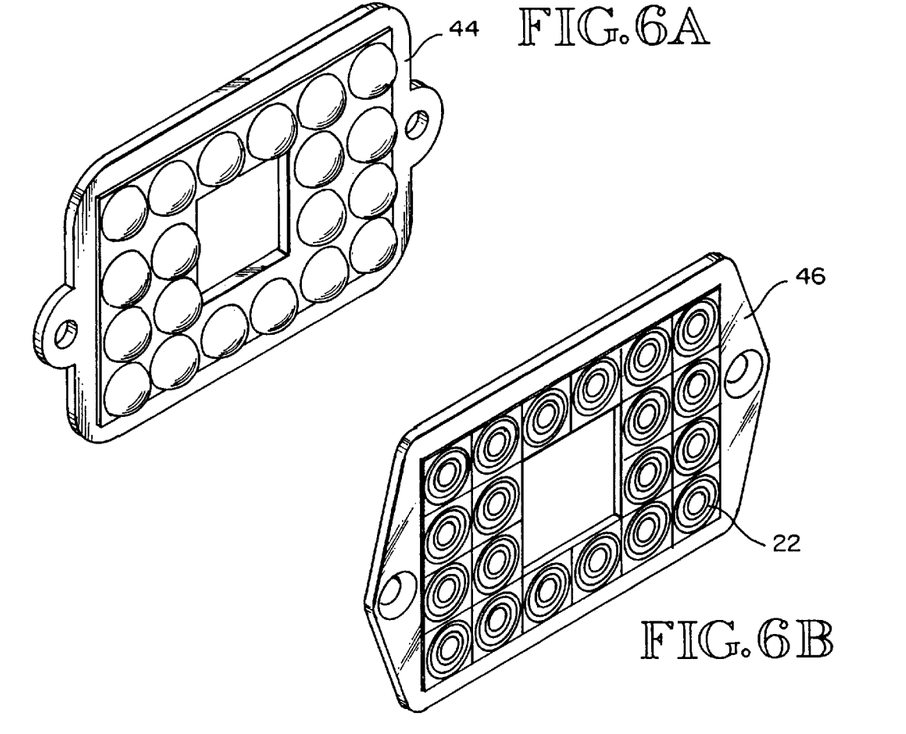
FIG. 6A is an isometric view of one embodiment of a refractive collimator.
FIG. 6B shows an isometric view of one embodiment of a diffractive collimator.

FIG. 6A shows a refractive collimator 44. FIG. 6B shows a diffractive collimator 46 with an integral diffusion surface 22. Collimator elements 44 and 46 bend the light emitted by the LEDs 18 so as to form parallel beams of light. The collimators are comprised of an array of collimating lenses arranged in the same pattern as the LED array 18. Optimally, the collimator is positioned such that the collimating lenses capture all of the light emitted by the LEDs 18.

It will be evident that there are additional embodiments which are not illustrated above but which are clearly within the scope of the present invention. The above description and accompanying drawings are therefore intended to be exemplary only and the scope of the invention is to be limited solely by the appended claims.

What is claimed is:

1. A device for reading optical code symbols, comprising:
a device casing having an open front end;
a charge coupled device image sensor having a focal plane and mounted within the device casing, the charge coupled device image sensor operable to sense optical energy reflected from the optical code symbol and provide data signals responsive to the sensed optical energy;
an imaging lens optics assembly positioned and mounted within the device casing so as to form an image on the focal plane of the charge coupled device image sensor;
a plurality of light emitting diodes mounted circumferentially to the imaging lens optics;
a plurality of collimators, each collimator positioned adjacent a respective one of the light emitting diodes and operable to provide collimated optical energy responsive to optical energy received from the adjacent light emitting diode; and
a plurality of light diffusers, each light diffuser positioned adjacent a respective one of the collimators and operable to provide diffused optical energy responsive to collimated optical energy received from the adjacent collimator, the diffusers collectively operable to illuminate with diffused optical energy respective optical code symbols moving at high speeds relative to the device casing, the diffused optical energy having sufficient power to enable the image sensor to sense optical energy reflected from the optical code symbol and provide data signals containing information about the sensed optical code symbol.

2. The device of claim 1, wherein each diffuser is integral with the corresponding collimator.

3. The device of claim 1, further comprising a plurality of polarizers, each polarizer disposed adjacent a respective light emitting diode so as to polarize the light emitted by right emitting diode.

4. The device of claim 3, wherein each polarizer is integral to the corresponding collimator.

5. The device of claim 1, wherein each collimator is integrally formed with the corresponding light emitting diode.

6. The device of claim 1 wherein the high speed of the optical code symbols results in respective code symbols having exposure times within the range of 0.1 milliseconds to 125 milliseconds.

7. A device for reading and decoding optical code symbols comprising:
device casing having an open front end;
charge coupled device image sensor having a focal plane and mounted within said device casing;
imaging lens optics positioned and mounted within said device casing so as to form an image on the focal plane of said charge coupled device image sensor;
plurality of light emitting diodes mounted circumferentially to said imaging lens optic;
collimator positioned relative to said light emitting diodes wherein said collimator has a plurality of collimating lenses so as to produce a field of illumination substantially congruent to the field of view of said imaging lens optics; and
light diffuser positioned between said light emitting open front end of said device casing.

8. The device of claim 2, wherein said plurality of collimating lenses are diffractive lenses.

9. The device of claim 2, wherein said plurality of collimating lenses are refractive lenses.

10. The device of claim 2 wherein the light diffuser comprises a plurality of diffusers, each diffuser positioned adjacent a respective one of the collimators to diffuse light received from the adjacent collimator.

11. The device of claim 10 wherein each diffuser is integrally formed with the corresponding collimator.

12. A device for reading optical code symbols comprising:
an image sensor;
an imaging lens optics assembly positioned so as form an image on said image sensor;
a plurality of illumination sources mounted circumferentially to said imaging lens optics; and
a plurality collimators, each collimator positioned adjacent a respective one of the illumination sources and operable to provide collimated optical energy responsive to optical energy received from the adjacent illumination source, the collimators collectively operable to illuminate with collimated optical energy respective optical code symbols moving at high speeds relative to the image sensor, the collimated optical energy having sufficient power to enable the image sensor to sense optical energy reflected from the optical code symbol without blur and provide data signals containing information about the sensed optical code symbol.

13. The device of claim 12 wherein the image sensor comprises a charge-coupled device.

14. The device of claim 12 wherein each of the illumination sources comprises a light emitting diode.

15. The device of claim 12 wherein each of the collimators comprises a Fresnel lens.

16. A method for reading an optical code symbol moving at a high speed relative to a fixed reference point, comprising:

receiving a plurality of optical energy groups, each optical energy group including light rays from a corresponding illumination source;

respectively collimating light from each of the optical energy groups to provide a plurality of collimated light groups;

respectively diffusing the collimated light groups to provide a plurality of diffused light groups;

applying light from each of the diffused light groups to the optical code symbol, the light from each diffused light group illuminating a portion of the optical code symbol;

sensing optical energy reflected from the optical code symbol responsive to the applied light from the diffused light groups; and detecting information contained in the optical code symbol from the sensed optical energy.

17. The method of claim 16 wherein light in each diffused light groups is polarized before being applied to the corresponding portion the optical code symbol.

18. The method of claim 16 wherein respectively collimating light from each of the optical energy groups to provide a plurality of collimated light groups comprises respectively refracting optical energy in the optical energy groups to thereby respectively collimate light in each of the optical energy groups.

* * * * *

UNITED STATES PATENT AND TRADEMARK OFFICE
CERTIFICATE OF CORRECTION

PATENT NO. : 6,105,869
DATED : August 22, 2000
INVENTOR(S) : Bruce R. Scharf, Donald S Fisher It is certified that error appears in the above-indentified patent and that said Letters Patent is hereby corrected as shown below:

claim 3, line 14, replace "right" with --the light--.

claim 7, line 40, after "emitting" insert --diodes and the--.

claim 12 line 59, after plurality insert --of--.

Signed and Sealed this

Twenty-fourth Day of April, 2001

Attest:

NICHOLAS P. GODICI

*Attesting Officer*     Acting Director of the United States Patent and Trademark Office

UNITED STATES PATENT AND TRADEMARK OFFICE
CERTIFICATE OF CORRECTION

PATENT NO.     : 6,105,869
DATED          : August 22, 2000
INVENTOR(S)    : Bruce R. Scharf and Donald S. Fisher It is certified that error appears in the above-identified patent and that said Letters Patent is hereby corrected as shown below:

Column 6,
Line 42, between "claim" and ", wherein", please replace "2" with -- 7 --.

Column 44,
Line 44, between "claim" and ", wherein", please replace "2" with -- 7 --.

Column 46,
Line 46, between "claim" and ", wherein", please replace "2" with -- 7 --.

Signed and Sealed this

Second Day of July, 2002

Attest:

Attesting Officer

JAMES E. ROGAN
Director of the United States Patent and Trademark Office